Figure 1:
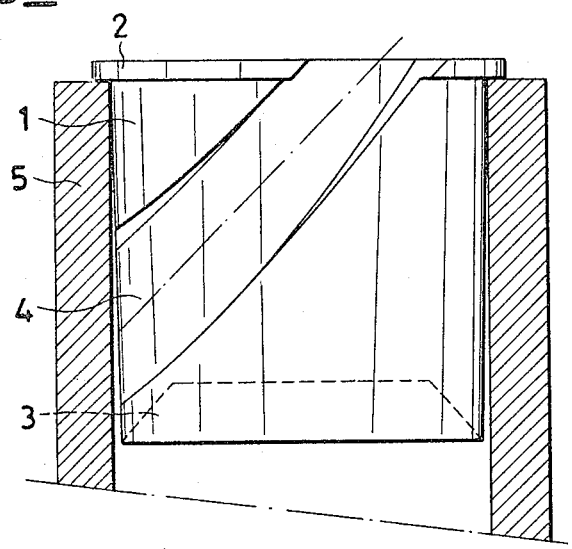

United States Patent [19]

Laganà'

[11] 4,317,786
[45] Mar. 2, 1982

[54] APPARATUS FOR DISTRIBUTING A LIQUID IN FILM-FORM ON THE INTERIOR WALLS OF VERTICAL TUBES

[75] Inventor: Vincenzo Laganà', Milan, Italy

[73] Assignee: Snamprogetti S.p.A., Milan, Italy

[21] Appl. No.: 215,170

[22] Filed: Dec. 11, 1980

[30] Foreign Application Priority Data

Jun. 5, 1980 [IT] Italy ............................. 22561 A/80

[51] Int. Cl.³ .......................................... B01F 3/04
[52] U.S. Cl. .................................. 261/112; 138/38; 141/392; 165/60; 239/468; 239/487; 239/492; 261/110; 422/310
[58] Field of Search .............. 422/148, 198, 200, 205, 422/312, 310; 261/97, 110, 112, 153; 141/392; 239/468, 487, 492; 138/38; 165/118, 60

[56] References Cited

U.S. PATENT DOCUMENTS

| | | | |
|---|---|---|---|
| 920,818 | 5/1909 | Breckenridge | 239/487 X |
| 1,914,700 | 6/1933 | Mitchum | 165/118 |
| 2,875,783 | 3/1959 | Schippers | 239/468 X |
| 3,437,124 | 4/1969 | Bryan et al. | 165/118 X |
| 4,199,537 | 4/1980 | Zardi et al. | 261/112 |
| 4,227,551 | 10/1980 | Hawkins et al. | 138/38 X |

FOREIGN PATENT DOCUMENTS

2321822 3/1974 Fed. Rep. of Germany ...... 239/487

*Primary Examiner*—Richard L. Chiesa
*Attorney, Agent, or Firm*—Morgan, Finnegan, Pine, Foley & Lee

[57] ABSTRACT

Improved apparatus for distributing a liquid in film form in the interior of vertical tubes in which a counterflow or cocurrent flow of liquid-vapor takes place. The apparatus includes a cylindrical body having an annular ledge and helical grooves on its peripheral surface, and wherein the cylindrical body is slightly tapered downwardly and inwardly to enable it to be easily introduced into the tube and to enable it to be freely rotated about its own vertical central axis. In the case of counterflow circulation, the cylindrical body has a blind laterally perforated vent tube on its top surface. In each instance the rotation of the body is effected by the liquid being distributed to inhibit the formation of deposits of solids from the liquid being distributed on the inner wall of the vertical tube.

9 Claims, 4 Drawing Figures

APPARATUS FOR DISTRIBUTING A LIQUID IN FILM-FORM ON THE INTERIOR WALLS OF VERTICAL TUBES

The present invention relates to improvements in the apparatus for distributing a liquid in film-form on the interior walls of vertical tubes, said apparatus being the subject-matter of the copending US patent application Ser. No. 97,786, filed on Nov. 27, 1979.

It is well known that one of the most serious problems in the use of film exchangers is that of attaining the most satisfactory possible distribution of the liquid along the interior walls of the vertical tubes of the exchanger. To achieve this object, many kinds of distributors have been used to encourage the formation of a liquid film adhering to the inner walls of the tubes.

The apparatus of the aforementioned patent application includes a solid cylindrical body having a ledge in the form of an annulus at its top end, a circular hollow space formed on its lower base and helical grooves on its external surface. The cylindrical body, or distributor, is introduced much in the way of a stopper in the top end of each tube of the tube bundle which makes up the film exchanger.

For the liquid to enter the tubes, it must flow along the helical grooves formed on the outer surfaces of the cylindrical body and adhere, to the inner walls of the tubes.

Such cylindrical bodies, or distributors, are not perforated at their tops. They only have peripheral slits through which the liquid may enter the helical grooves and the vapors which evolve from the liquid film during the heat-exchange fall cocurrently with the liquid, to be separated therefrom in the tub placed beneath the tube bundle.

It is also known that, when the film-exchangers are used in desalination installations and, more generally, when considerable volumes of liquids have considerable amounts of poorly soluble salts flow through such exchangers, solid deposits are formed in the interior of the tubes. These deposits essentially are caused by the precipitation of calcium carbonates, calcium sulfates, magnesium salts and others like them. The deposits cause a reduction of the heat-exchange or, in extreme cases, plugging of the tubes, the result being the stoppage of the installation run in order to clean the tubes, either with mechanical or chemical means.

For example, in installations for the desalination of sea water, stoppages are required at six-month intervals as a maximum, for cleaning to proceed.

In order that the deposit of insoluble salts on the interior walls of the tubes may be forestalled or inhibited, it is necessary to foster the formation of an even film the entire length of the tube wall throughout, because, if any rivulets are formed, an uncontrolled deposition of the insoluble salts contained in the liquid will occur.

The distributors disclosed in the above mentioned patent application, though they distribute the liquid over the interior tube walls in quite satisfactory a way, have not solved the problem of the formation of incrustations.

It has now been found that, by effecting slow rotation of said distributors, the incrustations in the interior of the tubes are considerably reduced. To impart such rotation, a very slight downward taper to the cylindrical body of the distributor is provided which also facilitates entry of the body into the tube without interference.

Having all these facts in view, an object of the present invention is to provide an apparatus for distributing a liquid in the form of a thin film on the interior of vertical tubes, of the kind comprised of a solid cylindrical body equipped with an annular ledge at its top end and with a circular hollow space on its bottom base and helical grooves on its outer surface, said apparatus being characterized in that said solid cylindrical body has a downward and inward taper of from 1 degree to 2 degrees.

Inasmuch as such an apparatus does not have perforations in its top section, it is adapted for use in the cocurrent liquid-vapor processes.

For liquid-vapor counterflow processes, the cylindrical body has a bore along its central axis, which communicates at its top with a blind vent tube equipped with lateral perforations through which the vapors can escape.

FIG. 1 of the accompanying drawings shows an apparatus of the first-named type, which has the solid cylindrical body, 1, fitted with its ledge 2 in the form of an annulus, the hollow space 3 formed through the bottom base and the helical grooves 4. Said cylindrical body has a slight downward and inward taper and is slipped into the tube 5.

Figure 2:
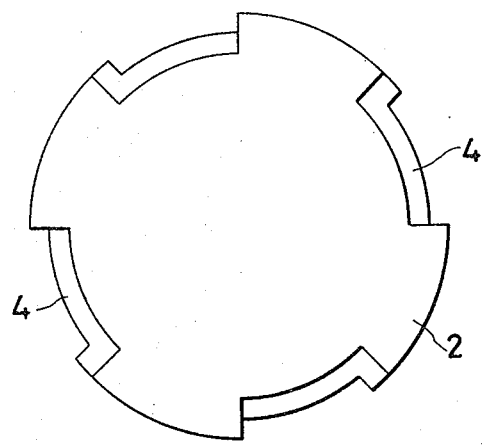

FIG. 2 shows the cylindrical body in top plan view.

Figure 3:
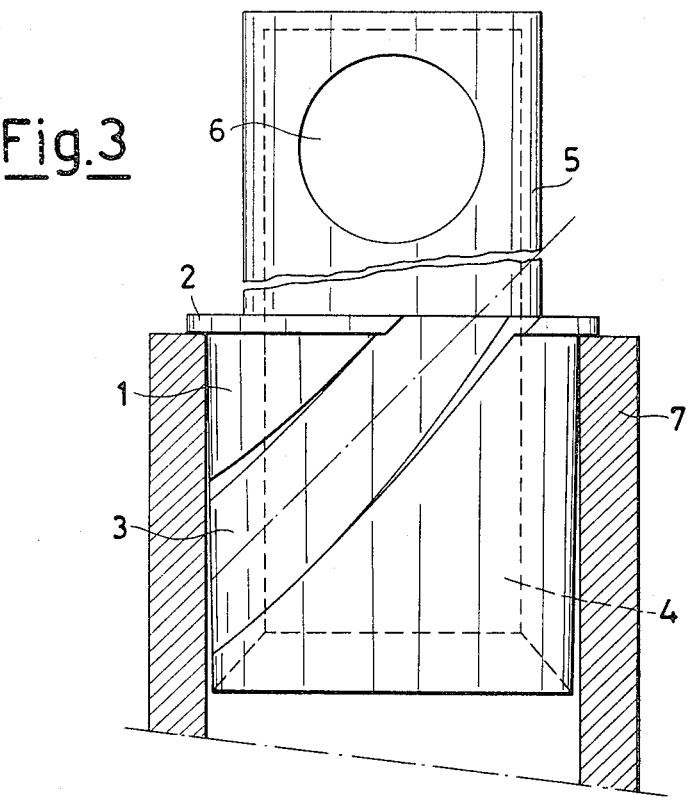

FIG. 3 shows an apparatus of the second-named type, which has the solid cylindrical body, 1, having its annular ledge 2, the helical grooves 3, the cylindrical bore 4 connected to the vent tube 5, the latter being sealed at its top and fitted with lateral perforations 6. The cylindrical body 1 has a slight downward and inward taper and is slipped into a tube 7 of the film exchanger.

Figure 4:
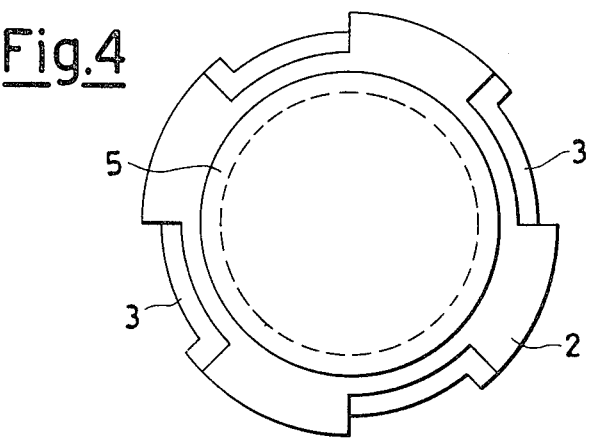

FIG. 4 shows a top plan view of the cylindrical body 1.

The operability of an apparatus of the first-named kind has been demonstrated for film-exchangers of a sea water desalination system designed by Snamprogetti SpA, the Assignee of the present application. The process performed by said system is the one known as multiple-effect evaporation and uses liquid-film evaporators in which the vapor evolved during distillation flows cocurrently with the liquid falling all along the interior walls of the tubes.

The system was run for about one year and stopped for inspection inasmuch as, quite surprisingly, no output decrease, or of worsening the heat exchange had been experienced.

During the inspection, it was observed that the tubes of the film exchangers were clean and only 7 tubes over a total of 1248 tubes showed incrustations which were caused by an unsatisfactory distribution of the brine due to clogging of the distributors' slits by foreign matter.

A careful examination of the clean tubes and of the respective distributors has led to the conclusion, quite surprisingly, that the absence of incrustations was due to a slight rotation of the distributors, caused by the liquid which, when falling along the helical grooves and in the conical clearance space existing between the distribution and the tube wall, induced the rotation-generating reaction. As a matter of fact, the liquid seeping through the clearance had a lubricating action which facilitated rotation.

The rotary action also has been demonstrated experimentally. The rotation speed was estimated at about one half revolution an hour.

The helical grooves had a width of 1 mm and a slope of 45 degrees relative to the vertical axis.

The distributor was designed for feeding a liquid at the rate of flow of about 130 liters an hour, the tube had an inside diameter of 20 mm, and the hydraulic elevation head of the liquid above the distributor was about 80 mm.

The rotational speed of the distributor can be increased, by making the slope of the grooves sharper and by increasing the rate of flow of the liquid therethrough. The reverse procedure can be adopted if a decrease of rotational speed is desired.

I claim:

1. In a distributor for causing liquid to be conveyed in the form of film on the inner wall of an essentially vertical tube, the improvement which comprises:

a generally cylindrical member slidably insertable in the upper end of the tube adapted to be rotated slowly for even distribution of liquid and for inhibiting the formation of deposits of solids on the inner wall of the tube, a ledge at the upper end of said member which abuts the upper end of the tube to limit the insertion of said member to the upper end thereof, helical grooves in the outer surface of said member which extend from the top of said ledge to the bottom of said member and which are open to the inner wall of the tube therebetween for receiving liquid to be distributed and for conveying such liquid within and along the length of said helical grooves and from the lower ends thereof onto the inner wall of the tube, and said member being tapered downwardly and inwardly from its upper portion of the lowermost end from about one degree to about two degrees to provide a clearance space between said member and the inner wall open to said grooves, wherein the downward flow of liquid being distributed from said grooves and space induces rotation of said member for even distribution of liquid in film form and for inhibiting the formation of deposits from the solids in the liquid on the inner wall of the tube.

2. A distributor as claimed in claim 1, in which the flow of liquid and vapors is cocurrent in the downwardly direction.

3. In a distributor for causing liquid to be conveyed in the form of film on the inner wall of an essentially vertical tube, the improvement which comprises:

a generally cylindrical member slidably insertable in the upper end of the tube adapted to be rotated slowly for even distribution of liquid and for inhibiting the formation of deposits of solids on the inner wall of the tube, a ledge at the upper end of said member which abuts the upper end of the tube to limit the insertion of said member to the upper end thereof, helical grooves in the outer surface of said member which extend from the top of said ledge to the bottom of said member and which are open to the inner wall of the tube therebetween for receiving liquid to be distributed and for conveying such liquid downwardly within and along the length of said helical grooves and from the lower ends thereof onto the inner wall of the tube, said member being tapered downwardly and inwardly from its upper portion to the lowermost end from about one degree to about two degrees to provide a clearance space between said member and the inner wall open to said grooves, wherein the downward flow of liquid being distributed from said grooves and space induces rotation of said member for even distribution of liquid in film form and for inhibiting the formation of deposits from the solids in the liquid on the inner wall of the tube, and said member having a bore along its central axis which is open at its upper end to venting means above said ledge of said cylindrical member for upwardly venting vapors from the tube.

4. A distributor as claimed in claim 3, in which said venting means is a tube on said ledge and above said member which is open to said bore and which is sealed at its upper end with lateral openings for the venting of the vapors.

5. A distributor as claimed in claim 1 or 3, in which the taper of said member extends from said ledge.

6. A distributor as claimed in claim 1 or 3, in which said clearance space is conical in shape with its base at the lowermost end of said member.

7. A distributor as claimed in claims 1 or 3, in which the liquid in the clearance space also acts as a lubricant which facilitates rotation of said member.

8. A distributor as claimed in claims 1 or 3, in which said member is rotated at about one-half revolution per hour.

9. A distributor as claimed in claims 1 or 3, in which the liquid being distributed is sea water.

* * * * *